March 12, 1940.     H. INGRAM     2,193,420
VENTING CLOSURE FOR JARS AND OTHER RECEPTACLES
Filed June 4, 1937
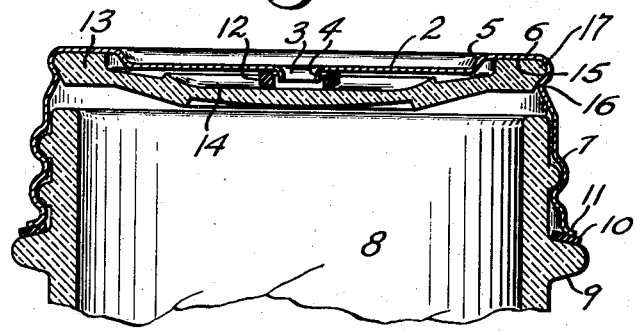
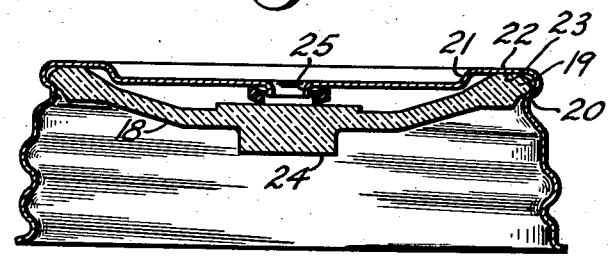
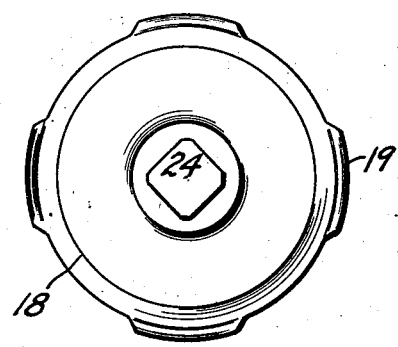
Inventor
Henry Ingram
by
Walter J. Kaufman
Attorney Patented Mar. 12, 1940

2,193,420

UNITED STATES PATENT OFFICE 2,193,420

VENTING CLOSURE FOR JARS AND OTHER RECEPTACLES

Harry Ingram, Wheeling, W. Va.

Application June 4, 1937, Serial No. 146,395

5 Claims. (Cl. 215—56)

My invention contemplates a closure including as an integral part thereof a diaphragm valve for automatically venting the container to which the closure is applied. The valve consists essentially of three elements, namely, an apertured flexible diaphragm, preferably formed integrally with the closure body, a gasket for sealing the aperture in the diaphragm and a supporting member for the gasket, all of the elements of the valve being so arranged that the closure and valve are unitary.

The present invention is particularly applicable to the so-called "Mason" type jar covers in which sealing is effected by engagement of a sealing ring with a flange or shoulder on the jar neck. In such closures it is possible to provide an extremely sensitive diaphragm without fear of "leakers", since sealing pressure is effected at the edge of the skirt and away from the zone of the diaphragm and any deformation of the closure incident to application to a receptacle is thus prevented from interfering in any manner with the action of the diaphragm. In my preferred embodiment, the entire valve assembly is disposed above and out of contact with the neck of the receptacle when the closure is in sealing position thereon, thus insuring that no strain will be placed upon the diaphragm which might vary its action.

In order to facilitate assembly and disassembly of the component elements forming the valved closure, the gasket support may be provided with a plurality of lugs or similar means engageable in recesses formed in the closure adjacent the top thereof, and by the mere expedient of inserting the support within the closure and rotating the same for a portion of a revolution, assembly may be effected. A digit engageable portion may be provided on the support to facilitate this operation. This feature will be of particular value to housewives who use the closure in home canning, since it permits easy access to the various elements forming the valve and simplifies cleaning after use.

I prefer to form the closure entirely from noncorroding materials in order that the closures may be reused without fear of contamination or leakage resulting in spoilage of the contents. The closure body or shell may be formed of zinc or suitably coated tin plate or any noncorrosive metal having such characteristics that a proper diaphragm action may be obtained. The valve gasket is preferably formed of rubber and the gasket support in the embodiments illustrated in the form of a glass disk.

My invention is illustrated in the attached drawing in which

Figure 1 is a sectional view illustrating a closure of the type covered by my invention, as applied to a Mason jar;

Figure 2 is a sectional view of a modified type of closure in which the gasket support is removable from the closure shell; and Figure 3 is a bottom plan view showing the gasket support of Figure 2.

Referring to Figure 1, the closure comprises a diaphragm 2 having a vent orifice 3 defined by an eyelet 4. The diaphragm is peripherally defined by a shoulder 5 integral therewith and angularly disposed with respect thereto. This shoulder 5 joins the diaphragm 2 with a flat annular surface or rim 6 and the shoulder 5 and rim 6 serve to limit any deforming action incident to the use of the closure to a portion thereof spaced from the zone of the diaphragm, whereby the diaphragm may be delicately controlled. An axially extending screw threaded skirt 7 depends from the top of the closure and serves as a means for securing the closure to a receptacle. In the illustrated embodiment the receptacle is a "Mason" jar 8. The "Mason" jar 8 is provided with a sealing shoulder 9 against which a sealing ring or gasket 10 is positioned and is engaged by an outwardly and downwardly extending flange 11 formed on the skirt 7. It will be observed that any force exerted in firmly positioning the closure on the receptacle with the flange 11 sealing against the gasket 10 positioned on the shoulder 9 will be limited to the skirt 7 and any force or reaction resulting from the pressure applied against the gasket 10 will be confined to the skirt 7 by the angularly related shoulder 5 and the rim 6, so that the action of the diaphragm 2 will not be deleteriously affected.

The diaphragm orifice 3 is sealed by a valve gasket 12 which is generally in the form of a ring having oppositely chamfered edges. The gasket 12 is held in position for engagement with the diaphragm 2 by a rigid support 13 which, in Figure 1, is a glass disk having a concavity 14 adapted to receive the gasket 12. The disk 13 is shaped so that normal movement of the diaphragm during venting and resealing is unrestricted thereby. The disk may be molded from plastics, such for example as "Bakelite", "Durez" and the like, or may be made of metal, such as a zinc die casting. The support is preferably made of noncorrosive material and if ferrous metal be used, it should be protected against corrosion by a suitable coating.

As is well known in this art, the diaphragm 2 is flexible and will move upwardly away from the support 13 upon creation of pressure within the receptacle to which the closure is applied, which pressure is in an amount greater than that of the ambient atmosphere. The amount of pressure required to effect opening of the valve depends upon a number of factors, such as the thickness of the diaphragm metal, the position of the gasket support with respect to the diaphragm in its sealed position and degree of flexibility imparted thereto in the formation. I prefer to have the diaphragm normally flexed toward the support in order that the vent orifice will be normally sealed by the valve gasket 12 engaging the underside of the diaphragm along a line circumscribing the orifice 3 and similarly engaging the gasket support. Upon creation of pressure within the receptacle, as by heating the contents thereof, the diaphragm 2 is flexed upwardly away from the support 13 and the gasket 12, and the gas within the receptacle escapes between the metal of the closure shell and the support and through the orifice 3. The closure is of course suitable for use in other vacuumizing processes such for example as the retort method wherein the pressure of the ambient atmosphere is reduced in the zone of the receptacle to be vacuum sealed and venting of the receptacle occurs by the pressure differential existing in the container. Any of the vacuumizing processes commonly practiced in the art are applicable for use with my closure.

In order to facilitate the attainment of a predetermined diaphragm action, that is, an action in which venting will occur upon creation of a predetermined pressure within the receptacle, the supporting disk 13 is carefully positioned with respect to the diaphragm. This is effected by providing the disk 13 with a flat annular surface 15 which corresponds with and engages the rim 6 on the top of the closure shell. This insures that the valve support will always assume a predetermined position with respect to the diaphragm and thus the diaphragm action may be controlled within narrow limits.

In the assembly of the closure of Figure 1, the metal shell which is formed to substantially final shape, incuding the formation of the diaphragm, supporting shoulder and rim, the vent orifice and screw threaded skirt portions, is provided with a cylindrical wall extending from the rim 6 to the first of the thread formations. The valve gasket 12 is positioned surrounding the eyelet 4 and the disk 13 is placed within the closure with the rims 6 and 15 lying in engagement. The cylindrical wall is then spun inwardly by suitable rotary forming tools to provide a ledge 16 defining a recess receiving the lip 17 of the support 13 and holds the support 13 in firm engagement with the shell and in fixed position with respect to the diaphragm.

In this structure, the valve gasket, gasket support and closure shell are unitary and are movable as a unit. The valve support is not removable from the closure, however, without mutilation thereof. Such removal may be found desirable, particularly by the home canner who will reuse the closure from time to time. For this purpose the modification shown in Figure 2 may be found desirable.

In this embodiment, the valve elements are substantially the same as those of Figure 1, excepting that the valve support 18 is formed with a plurality of lugs 19, in the illustrated embodiment four, which are adapted to lie within corresponding recesses defined by ledges 20 formed in the closure shell between the screw threaded portion and the top thereof. In the embodiment shown in Figure 1, the diaphragm is protected by an angularly related shoulder 21 and an annular rim 22 and the glass disk support has a corresponding annular flat portion 23.

The disk may be provided with a projection 24 to be grasped by the fingers or a wrench to facilitate insertion or removal of the support from the closure shell. This permits rapid hand assembly by the closure manufacturer and permits the housewife to remove the support to facilitate cleaning and replacement of the valve elements.

The area of the shell between the adjacent ledges 20 is struck radially outwardly in order that the lugs 19 may pass freely in an axial direction until the rim 22 and flat 23 engage. In assembly, the gasket is positioned surrounding the eyelet 25, the support 18 is placed within the cap and the lugs 19 lying with the area between adjacent ledges 20, and the support 18 is rotated until the lugs 19 lie within their corresponding recesses defined by the ledges 20. The ledges are preferably so formed that the flat annular surface 23 of the support is urged into firm engagement with the rim 22 of the top of the closure as by tapering the ledges toward the top of the cap to "cam" the support toward the top, insuring proper positioning of the support with respect to the diaphragm.

The closure of Figure 2 operates in exactly the same manner as the closure of Figure 1, that is, upon creation of pressure within the receptacle, gas escapes between the metal of the closure shell and the disk support, thus urging the diaphragm upwardly and away from the support and permitting escape of the gas through the vent orifice. Upon release or reduction of pressure, the diaphragm assumes its normal, sealed position.

While I have illustrated and described certain preferred embodiments of my invention, it will be understood, that it is not limited to the forms shown, but may be otherwise embodied within the scope of the following claims.

I claim:

1. A unitary valved closure comprising a closure shell having a top, a skirt having receptacle engaging means thereon and a sealing flange extending therefrom, a flexible diaphragm having an orifice therein, said diaphragm forming an integral part of said top, an annular channel shaped portion joining the diaphragm and the skirt and providing a flat annular surface at the top of the shell, an inwardly projecting ledge disposed between the flat annular portion of the top and the receptacle engaging means on the skirt, a rigid gasket supporting disk having an outer annular portion and a lip, said support being disposed within the shell with the outer annular portion lying in engagement with the flat annular portion of the top of the shell and with the lip lying within the recess defined by the inwardly projecting ledge, whereby the support is held in predetermined position with respect to the diaphragm, and a valve gasket adapted to seal the diaphragm orifice when the diaphragm is flexed toward the support.

2. A unitary valved closure in accordance with claim 1 in which the gasket support is circular and is held in predetermined position with respect to the diaphragm by a portion of the skirt of the closure which is disposed under the lip on the support whereby the support is firmly held in position and is not removable from the closure shell.

3. A unitary valved closure in accordance with claim 1 in which the gasket support is provided with a plurality of lips or lugs engageable in corresponding recesses defined by a plurality of ledges in the skirt of the shell.

4. A unitary valved closure in accordance with claim 1 in which the gasket support is provided with a plurality of lips or lugs engageable in corresponding recesses defined by a plurality of ledges in the skirt of the shell and in which there is provided on the support a projection to facilitate removal of the support from the closure shell.

5. The combination of a glass receptacle having a neck portion provided with closure securing projections thereon and a sealing shoulder projecting radially outwardly from the neck portion therebelow, a closure for said receptacle comprising a metal shell having an integrally formed apertured diaphragm in the top thereof, an annular channel-shaped portion angularly joining the diaphragm with a skirt integral with and depending from the top of the closure and having receptacle engaging means thereon, such channel-shaped portion including a flat annular surface at the top of the shell adjacent the periphery thereof, said channel-shaped portion constituting means limiting any deformation of the closure incident to assembly thereof with a container to portions of said closure other than said diaphragm, a radially inwardly projecting ledge formed on the skirt and disposed between the flat annular portion of the top of the shell and the receptacle engaging means on the skirt, a rigid gasket supporting disk having a flat outer annular portion, a depressed central portion and a peripherally disposed lip, said support being disposed within the shell with the flat portion lying in engagement with the complementary flat portion on the top of the shell and with the lip thereof lying within the recess defined by the inwardly projecting ledge, the arrangement being such that the support is held in fixed and predetermined position with respect to the diaphragm which is free for unrestricted movement to effect venting and automatic sealing of said vent orifice in the diaphragm, a valve gasket adapted to seal the diaphragm orifice when the diaphragm is flexed toward the support, and a sealing flange on the skirt and extending radially outwardly therefrom, and a sealing ring disposed between the sealing flange on the skirt and the sealing shoulder on the receptacle.

HARRY INGRAM.